United States Patent [19]

Hanneman et al.

[11] 3,845,253

[45] Oct. 29, 1974

[54] INTERCONNECTING ASSEMBLY

[75] Inventors: Thomas W. Hanneman, Fountain Valley; Jeffrey A. Cook, Los Angeles, both of Calif.

[73] Assignee: Communication Mfg. Co., Long Beach, Calif.

[22] Filed: Oct. 18, 1972

[21] Appl. No.: 298,557

[52] U.S. Cl. ........... 179/179, 179/98, 317/101 CM, 317/101 DH, 339/17 M

[51] Int. Cl. ......................... H05k 1/04, H04m 1/00

[58] Field of Search... 317/101 C, 101 CB, 101 CC, 317/101 CE, 101 CM, 101 D, 101 DH; 179/16 F, 98, 179; 339/17 M, 18 R, 18 B, 18 C, 95

[56] References Cited

UNITED STATES PATENTS

| | | | |
|---|---|---|---|
| 3,158,419 | 11/1964 | Meyer et al. | 339/18 B |
| 3,406,368 | 10/1968 | Curran | 317/101 DH |
| 3,416,125 | 12/1968 | Theve | 339/18 B |
| 3,596,138 | 7/1971 | Lehrfeld | 317/101 CC |
| 3,688,635 | 9/1972 | Fegen | 317/101 CC |

OTHER PUBLICATIONS

New Product Bulletin, "Cle-Eq Loop Extender" Continental Telephone Electronics, Apr. 1, 1972.

*Primary Examiner*—Kathleen H. Claffy
*Assistant Examiner*—Randall P. Myers
*Attorney, Agent, or Firm*—Christie, Parker & Hale

[57] ABSTRACT

An electrically interconnecting assembly has a first part with an exposed circuit conductor thereon and an opening extending through the conductor into the part. A second part has an exposed circuit conductor thereon positioned spaced away from the first part. At least a portion of the conductors of the parts are in facing relationship. An insulating member is positioned between the parts and has a passage therethrough aligned with the facing conductors. A conductive member extends into the opening and has an end engaging the exposed conductor on the second part to the passage in the insulating member. An electrically conductive compression spring has a part engaging the exposed conductor on the first part and a second part engaging the conductive member, thereby forcing the member into tight electrical contact with the exposed conductor on the second part.

10 Claims, 4 Drawing Figures

INTERCONNECTING ASSEMBLY

BACKGROUND OF THE INVENTION

This invention relates to interconnecting arrangements for electrical assemblies and, more particularly, to an interconnecting arrangement for a telephone repeater assembly.

The E6 repeater assembly is disclosed in Section 332-206-100, Issue 1, Standard Practice Manual published by the American Telephone and Telegraph Company, September, 1959. The repeater assembly has a shell with a pair of interior walls. A pair of parallel upper guides and a pair of parallel lower guides are provided on the opposing walls and the upper and lower guides are separated by a connecting plate. The connecting plate has an opening therein to allow interconnection from the upper to the lower side of the plate. A signal gain module having a voice signal gain circuit is positioned on the lower side of the plate. An impedance matching line build-out module is normally affixed on the upper side of the plate and an insulating block is positioned in the plate opening. Electrical and mechanical connections are made by metal bolts between the line build-out module and the signal gain module through openings in the insulating block, thereby providing both an electrical and a mechanical connection in the assembly. The electrical connection provides electrical connection between circuits in the line build-out module and the gain module and the mechanical connection rigidly holds the line build-out module and the gain module in place through interference of the insulating block with the plate.

It has become necessary to provide what is referred to as a loop extender for long subscriber telephone loops. The purpose of the loop extender is to provide D.C. voltage in addition to that of the central office battery in order to increase the applied D.C. potential to the subscriber loop while a telephone subscriber has the telephone off hook.

The loop extender requires a source of potential to generate the required D.C. voltage. Additionally, because of physical limitations, it is desirable to house the loop extender circuit in the shell of the above-mentioned E6 repeater assembly.

One prior art loop extender is designed so that it is positioned and housed in the shell of the E6 repeater assembly, but because of special wiring and a special package, it causes the E6 repeater assembly to stick out of the mounting shelf. This is undesirable because it appears to telephone personnel as if the repeater assembly has been pulled out of the shelf and is hence a non-functioning unit.

Another loop extender has been added to the E6 repeater assembly, however, special wires extend out of the repeater assembly to the loop extender in order to carry the necessary power to generate the D.C. voltage. This is undesirable since it causes an unsightly assembly and raises chances that the wires may be inadvertently pulled loose from their connections.

SUMMARY OF THE INVENTION

A preferred embodiment of the present invention is directed to a way of getting D.C. power from an existing gain module of a repeater assembly to a newly added loop extender circuit which requires a minimum of modification and rewiring and allows the overall repeater assembly to remain intact.

Briefly, one embodiment of the present invention is an electrically interconnected assembly. Included is a housing with a pair of interior opposing walls and a connecting plate interconnecting the walls and positioned in between the upper and lower guides. The plate has an opening therein. A first electrical modular unit is mounted between the sides and has a side facing one side of the connecting plate. The side of the electrical modular unit has at least one exposed conductive circuit thereon. A second electrical modular unit is mounted on the second side of the plate and on a second side of the opening and has exposed conductive circuits thereon with at least one opening extending into the second unit through a conductive circuit. An insulating block is positioned in the opening and has passages therethrough. An elongated conductive connecting member has a shoulder thereon and a first end. The connecting member extends through the opening in the second unit and through a first passage in the insulating block. The first end engages the conductive circuit on the first modular unit. A conductive spiral compression spring is positioned on the connecting member extending in between the shoulder and the exposed conductive circuit on the second unit.

A preferred embodiment utilizes an insulating block with a recessed portion around the first passage and a portion that is raised with respect to the recessed portion. The second modular unit engages the raised portion of the insulating block and the first modular unit engages the other side of the insulating block, thereby providing a space for the shoulder to move in the recess.

Although a preferred embodiment of the present invention is in an electrical assembly of the aforementioned type, the invention preferably is in the form of a telephone repeater assembly in which the first electrical modular unit is a telephone signal gain module. The second electrical modular unit is a loop extender circuit board. It is felt that the embodiment of the invention in a telephone repeater assembly has special inventive features because of the particular problems of interconnecting between the power supply conductors on the gain module and the power input conductors to the loop extender.

Preferably, a line building-out module is provided with connectors at one end and an electrical connector is connected between the electrical connector on the line building-out module and the signal gain module through an opening in the insulating member, thereby holding the line building-out module against longitudinal movement because of the interference between the insulating block and the opening in the plate.

However, it is felt that within the broader inventive concepts of the present invention, there is encompassed an electrically interconnected assembly having a first part with an exposed circuit conductor thereon and an opening extending through the conductor into the part. A second part has an exposed circuit conductor thereon positioned spaced away from the first part. A least a portion of the conductors of the parts are in facing relationship. An insulating member is positioned in between the parts and has a passage therethrough aligned with the facing conductors. A conductive member extends into the opening and has an end engaging the exposed conductor on the second part through the passage in the insulating member. An electrically conductive compression spring has a part engaging the exposed conductor on the first part and a second part engaging the conductive member, thereby forcing the conductive member into tight electrical contact with the exposed conductor on the second part.

DESCRIPTION OF THE PREFERRED EMBODIMENT

Figure 1:
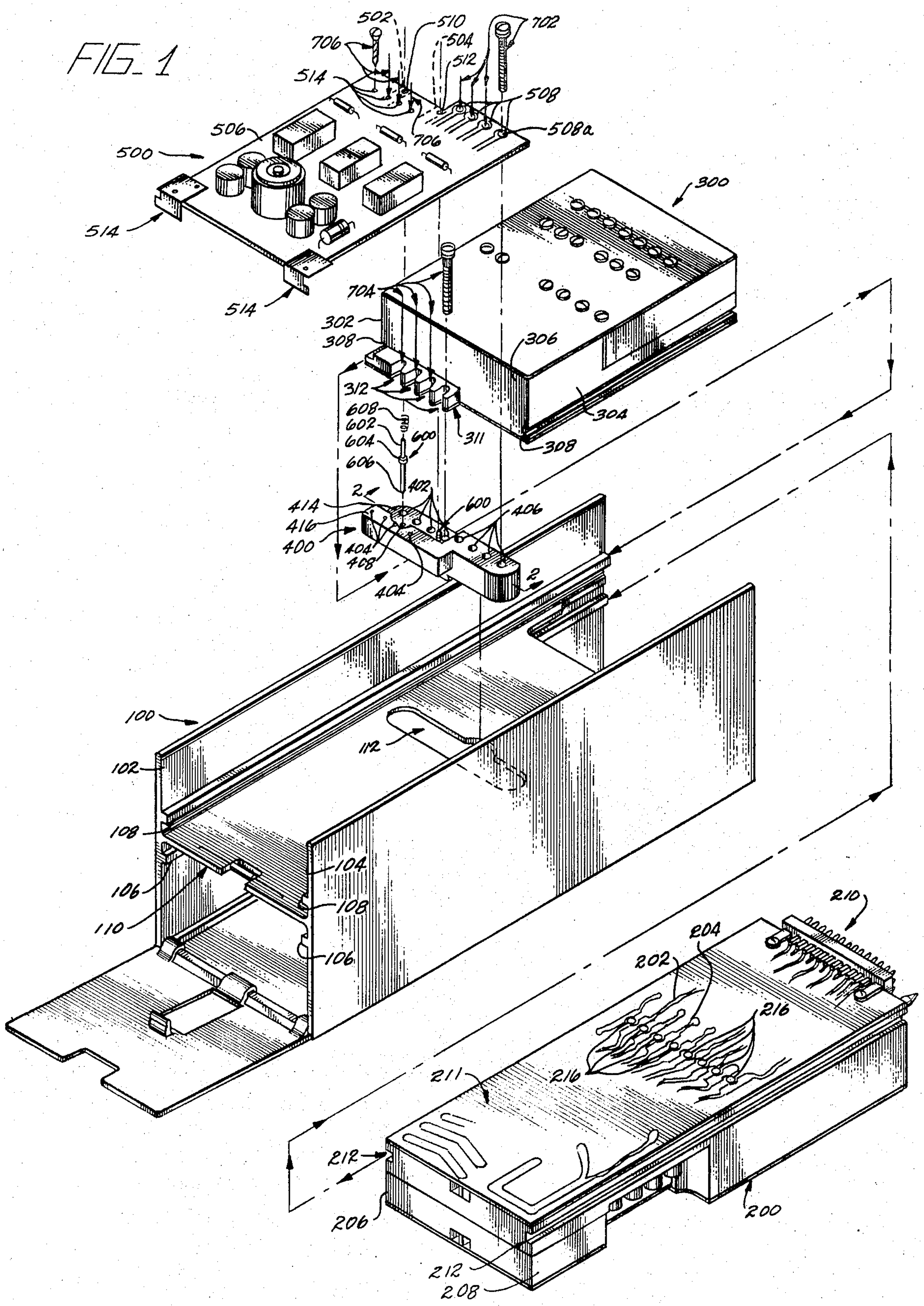
FIG. 1 is an exploded elevational view of a repeater assembly with a loop extender circuit board and embodying the present invention.

Refer now to the figures. FIG. 1 shows an overall exploded assembly view of the telephone repeater assembly embodying the present invention. A shell 100, a telephone signal gain module 200, an impedance matching line build-out module 300 are parts of the well known E6 repeater assembly identified hereinabove. Added to the standard E6 repeater assembly is a special insulating block 400, a loop extender circuit board 500, and electrical interconnecting assemblies 600. Actually the insulating blocks 400 replace standard insulating blocks normally used in the E6 repeater assembly.

To be explained in more detail hereinafter, one of the important features of the present invention is the way in which the electrical interconnecting assemblies 600 provide power connections between the conductive circuit connections on the gain module 200 (in the form of printed circuit conductors 202 and 204) and conductive circuit connections on the bottom side of the circuit board 506 of the loop extender circuit board 500 (in the form of printed circuit conductors 502 and 504).

Figure 4:
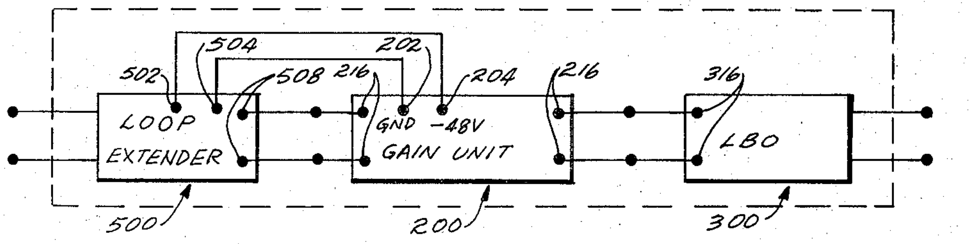
FIG. 4 is a schematic and block diagram illustrating the power connections between the gain module and the loop extender circuit board.
Figure 2:
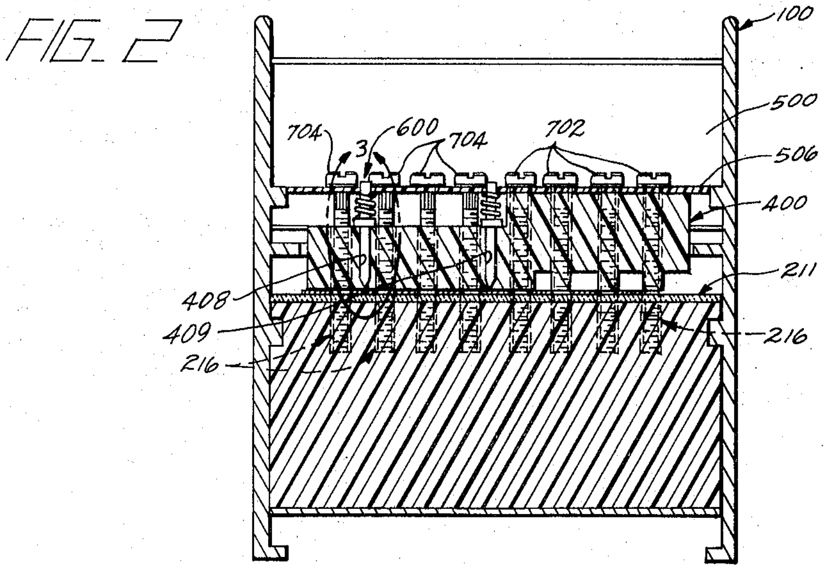
FIG. 2 is a section view of the repeater assembly taken along the lines 2—2.

FIG. 4 shows a schematic and block diagram of the line build-out module 300, the gain module unit 200 and the loop extender 500. As indicated, ground (0 volts) and −48 V. power are brought from the gain module unit 200 to the ground and −48 V. power input for the loop extender 500.

Refer now to the shell 100. The shell has a pair of interior opposing walls 102 and 104. A pair of parallel upper guides 108 and a pair of parallel lower guides 106, one guide of each pair, is provided on each of the walls 102 and 104. A connecting plate 110 interconnects the walls 102 and 104 and is positioned in between the upper and lower parallel guides. Significantly, the plate 110 has an opening 112 therein into which the lower portion of the insulating member 400 is positioned and forms an interference for movement longitudinally in the shell 100.

The telephone signal gain module is the 831A gain unit and has a voice signal gain circuit (not shown) for the repeater assembly. The gain module 200 has a pair of oppositely facing sides 206 and 208 and an end 210 positioned in between the sides and an upper surface 211. A pair of parallel guides 212 are positioned in the sides 206 and 208, and engage the lower guides 106 in the shell 100. A connector is positioned at the end 210 and has connector pins for outputs and inputs for the overall repeater assembly. The upper surface 211 has thereon a number of printed circuit conductors, including the conductors 202 and 204 between which ground and −48 V. source of power are provided for the gain circuitry in the gain module 200. An inter module electrical and mechanical connector part 216 in the form of threaded connectors in conductors extend into the upper surface 211. The threaded connectors 216 provide electrical connections (not shown) to the circuitry in the signal gain module and provides a mechanical connection to prevent longitudinal movement of the signal gain module with respect to the shell 100.

The line building-out module 300 may be the standard 830A line build-out network or other standard line build-out networks used with the E6 repeater assembly. The line building-out module 300 has a pair of oppositely facing sides 302 and 304 and an end 306 positioned in between the sides. A pair of parallel guides 308 are provided on the sides 302 and 304, respectively, for engaging the upper guides 108 in the shell 100. An extension 311 carries four connector parts 312 in the form of an open eyelet electrical terminals. The connector parts 312 are the input and output connections for the line building-out module 300 as indicated in FIG. 4.

A loop extender circuit board assembly 500 includes the circuit board 506. The loop extender circuit on the board 506 is of the type disclosed in co-pending U.S. patent application Ser. No. 298,558, filed on the same date herewith in the names of Frederic R. Sparrevohn and Thomas W. Hanneman and entitled "Loop Current and Voltage Sensitive Loop Extender" and is incorporated herein by reference. Indicated schematically on the circuit board 506 are electrical componenets forming the actual circuit for increasing the loop voltage.

The circuit board 506 has conductive electrical connecting circuits in the form of printed circuit conductors 502 and 504 which are the power inputs to the circuit board. The power input is used to generate the required signal for boosting the battery voltage on the telephone lines. In addition, two input circuits and two output circuits are connected to conductive electrical interconnecting circuits in the form of four printed circuit conductors 508. To be explained in more detail, the circuit board has passages 508*a* extending through the board and through the conductors 508 and passages 510 and 512 extending through the board and through the conductors 502 and 504, respectively. These passages provide interconnection between the circuit board assembly 500 and the gain module 200.

The insulating block 400 has a lower perimeter which closely matches that of the opening 112. The insulating block 400 has passages 402 spaced apart for alignment with the connector parts 312. The insulating block 400 also has four passages 406 extending therethrough, each of which aligns with one of the passages 508 in the circuit board 506.

Four openings 404 are provided into the insulating block 400, each of which is aligned with one of the passages 514 in the circuit board 506. Two additional passages 408 are provided and aligned with passages 510 and 512. To be explained in more detail, an elongated conductive connecting member of each assembly 600 extends through one of the passages 408 and into one of passages 510 and 512 to provide an electrical connection between the conductors 502 and 504 on the circuit board 506 and the conductors 202 and 204 on the signal gain module 200.

In assembly, the signal gain module 200 may be inserted from right to left in the shell 100, using the guides 212 and 106. The insulating block 400 is vertically downward into the opening 112 and engages the upper surface 211 of the signal gain module 200. The line building-out module 300 is slid into the shell 100 from right to left, using the guides 308 and 108. The extension 311 of the line building-out module 300 slides over a recessed surface portion 414 surrounding the openings 402 and 408 in the insulating block 400.

Guides 514 are provided along opposite edges at the left hand end of the circuit board 506. The circuit board 506 is inserted into the shell 100 from left to right until the guides 514 engage the upper guides 108. The circuit board 506 is so positioned that the lower surface thereof engages an upper raised portion 416 of the insulating block 400 with each one of passages 508 aligned with a different one of the passages 406, the passages 510 and 512 aligned with the passages 408 and 409 and each one of the passages 514 aligned with a different one of the openings 404.

Significantly, the connecting assemblies 600 provide electrical connection between the conductors 502 and 504 on the bottom surface of the circuit board 506 and the conductors 202 and 204 on the upper surface 211 of the signal gain module 200. The connecting assembly 600 includes an elongated conductive connecting member 602 having a radial boss or shoulder 604 formed as an integral part thereof and a sharp pointed end 606. The connecting member extends through the passages 408 and 409 in the insulating member 400 with the sharp end engaging the conductors 202 and 204 on the signal gain module. The opposite end 610 of the conductive connecting member extends through the passage 510 in the circuit board. It will be seen that although the passage 510 extends clear through board 506, it need only be an opening extending into but not all of the way through. An electrically conductive spiral compression spring 608 is positioned over the end 610 of the elongated conductive connecting member 602 and extends in between the shoulder 604 and the conductor 502 which surrounds the passage 510.

Figure 3:
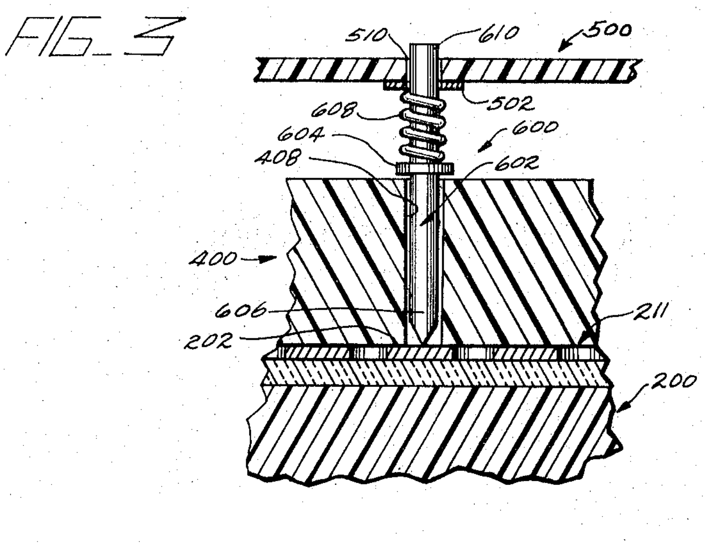
FIG. 3 is an enlarged view of the area indicated at 3 in FIG. 2 and embodying the broad principles of the present invention.

With the arrangement of the connecting assembly 600, the spiral compression spring urges the elongated conductive member 602 in a downward direction as seen in FIG. 3. As a result, the pointed end 606 of the connecting member 602 is forced into tight electrical engagement with the conductor on surface 211. As a result, a good electrical contact is made between the connecting member 602 and the conductor 502 through the spring action of the spiral compression spring 608.

Electrical and mechanical connectors in the form of bolts 702 and 704 are provided for electrical and mechanical connections between modules through the insulating block 400 and to provide a mechanical connection rigidly holding the various modules in place within the shell 100.

To this end, four bolts 702 are provided, each one of which extends through a different one of the four passages 508 and passages 406 into threaded engagement with a different one of the threaded connector parts 216 in the signal gain module 200. One only bolt 702 is shown, the others being indicated by arrows for simplicity.

Similarly, four bolts 704 are provided (only one being shown, the others being indicated by arrows), each extending through a different one of the connectors 312 and passages 402 into a different one of the threaded connector parts 216 in the gain module 200. As a result of the electrical and mechanical connections of the bolts 702 and 704, the signal gain module 200 is rigidly affixed together to the line building-out module 300 and the loop extender circuit board 506 through the insulating block 400, thereby holding the overall assembly rigidly in place. As an added mechanical connection, our self-tapping screws 706 are provided (only one being shown, the others being indicated by arrows), one extending through each of the openings 514 into one of the openings 404 in the insulating block 400 to thereby rigidly connect the circuit board 506 to the insulating block 400.

Although an exemplary embodiment of the invention has been disclosed for purposes of illustration, it will be understood that various changes, modifications and substitutions may be incorporated in such embodiment without departing from the spirit of the invention as defined by the claims appearing hereinafter.

What is claimed is:

1. An electrically interconnected assembly comprising:

a. a housing comprising:
   a pair of interior opposing walls, and
   a connecting plate interconnecting said walls and having an opening therein;
b. a first electrical modular unit mounted between said sides and having a side facing one side of said connecting plate, said side having at least one exposed conductive circuit thereon;
c. a second electrical modular unit mounted on the other side of the connecting plate and having a side comprising thereon exposed conductive circuits facing said opening and at least one opening extending into the second unit through one of said conductive circuits thereon;
d. an insulating block positioned in said connecting plate opening and having passages therethrough; and
e. a connecting assembly comprising:
   an electrically conductive member elongated between two ends and having a first portion extending into said opening in said second unit and a second portion extending through a first one of said passages in said insulating block to one end of the conductive member which engages at least one of said conductors on said second unit;
   an electrically conductive shoulder electrically and mechanically connected to said conductive member in between said second unit and insulating member, and
   an electrically conductive spiral compression spring surrounding said first member portion from a first end of the spring that engages the exposed conductor surrounding said opening on said second unit to a second end of the spring that engages said shoulder.

2. An assembly according to claim 1 wherein said one end of the conductive member has a sharp point for providing good electrical contact.

3. An assembly according to claim 1 wherein said insulating block comprises a first portion into which said first passage extends, and a second portion raised with respect to said first portion engaging said second modular unit, thereby providing a space for movement of the shoulder in between the first portion and said second modular unit.

4. An electrically interconnected assembly according to claim 1 wherein said housing comprises a pair of parallel upper guides, one in each of said walls, a pair of parallel lower guides, one in each of said walls, and wherein said first and second electrical modular units each comprise a pair of oppositely facing sides having guides for mating with the lower guides and upper guides, respectively.

5. An assembly according to claim 1 wherein said first electrical modular unit comprises a telephone signal gain module having a source of power and said exposed conductive circuit is connected to said source of power, said second electrical modular unit comprising a telephone loop extender circuit whose power input is connected to said exposed conductive circuit on said first electrical modular unit.

6. An electrically interconnected assembly comprising:

a housing comprising:
 a pair of interior opposing walls;
 a connecting plate interconnecting said walls and having an opening therein;

b. a first electrical modular unit mounted between said sides and having a side facing one side of said connecting plate, said side having at least one exposed conductive circuit thereon and at least one inter unit connector part;

c. a second electrical modular unit mounted on a second side of said plate and at a first side of said opening and comprising at least one electrical connector adjacent said opening;

d. a third electrical modular unit mounted on said second side of the plate at a second side of said opening and comprising exposed conductive circuits thereon and at least one opening extending into the third unit through an exposed conductive circuit;

e. an insulating block positioned in said plate opening having a surface portion spaced from said exposed conductive circuit with the opening and having passages therethrough at the spaced surface portion;

f. a connecting assembly comprising:
 an electrically conductive member elongated between two ends and having a first portion extending into said opening in said third unit and a second portion extending through a first one of said passages to one end of the conductive member which engages said at least one exposed conductive circuit on said first unit;
 an electrically conductive shoulder electrically and mechanically connected to said conductive member in between said third unit and said insulating block; and
 an electrically conductive spiral compression spring surrounding said first member portion from a first end of the spring that engages the exposed conductor surrounding the opening in said third unit to a second end of the spring that engages said shoulder; and g. an electrical connector connected between said electrical connector on said second unit and said inter unit connector part through another passage in said insulating block.

7. A telephone repeater assembly comprising:

a. a shell comprising:
 a pair of interior opposing walls;
 a pair of parallel upper guides, one on each of said walls;
 a pair of parallel lower guides, one on each of said walls; and
 a connecting plate interconnecting said walls and positioned in between said upper and lower guides and having an opening therethrough;

b. a telephone signal gain module having a voice signal gain circuit for said repeater assembly, said gain module having a pair of oppositely facing sides, an end and an upper surface, a pair of parallel guides, one on each of said pair of sides for engaging said lower guides, a connector positioned at said end having connector pins for outputs and inputs for the assembly, said upper surface having thereon at least one inter module electrical connector part and at least one conductive circuit connection having power for the gain circuitry;

c. an impedance matching line building-out module for said repeater comprising a pair of oppositely facing sides and an end in between said sides, a pair of parallel guides, one on each of said last mentioned sides for engaging said upper guides and additionally comprising at least one electrical connector part on the end thereof;

d. a loop extender circuit board having a circuit for increasing direct current electrical signals passing through said gain module, said circuit board comprising a conductive electrical interconnecting circuit on the board, at least one opening extending through the circuit board and through an interconnecting circuit and an electrical connector at one end of the circuit board;

e. an insulating block positioned in said plate opening and having passages therethrough at a block surface portion, the loop extender circuit board being positioned with the conductive electrical interconnecting circuit spaced away from and facing said insulating block surface portion and with said opening in the interconnecting circuit aligned with a first passage in said insulating block, the line building-out module having the eletrical connector thereof aligned with a second one of said passages in said insulating block, said gain module having at least one conductive circuit connection aligned with said first insulating block passage and said second insulating block passage being aligned with said gain module inter module electrical connector part;

f. a connecting assembly comprising:
 an electrically conductive member elongated between two ends and having a first portion extending into said opening in said loop extender circuit board and a second portion extending through said first passage in the insulating block to one end of the conductive member which engages said at least one conductive circuit on said gain module,
 an electrically conductive shoulder electrically and mechanically connected to said conductive member in between said loop extender circuit board and said insulating block, and an electrically conductive spiral compression spring surrounding said first member portion from a first end of the spring that engages the interconnecting circuit through which the opening extends and a second end of the spring that engages said shoulder; and g. an electrical and mechanical connector connected between said electrical connector part on said line building-out module and said inter module electrical connector part through said second insulating block passage.

8. A telephone repeater assembly according to claim 7 wherein said conductive electrical interconnecting circuit on the loop extender circuit board comprises a power supply input for the loop extender circuit and wherein said gain circuitry comprises a power supply connected to said at least one conductive circuit connection forming part of the gain circuitry.

9. An electrically interconnected assembly comprising:

a. a housing;

b. a first part secured in the housing and having an exposed circuit conductor thereon and an opening extending through said conductor into said part;

c. a second part secured in the housing having an exposed circuit conductor thereon positioned spaced away from said first part, at least a portion of the conductors of the parts being in facing relationship;

d. an insulating member positioned in between said parts and having a passage therethrough aligned with said facing conductors, said housing having a wall in between said first and second parts, the wall having an opening into which said insulating member is positioned; and e. a connecting assembly comprising:

an elongated electrically conductive member having a first portion extending into said opening and a second portion extending through said passage to one end of the conductive member which engages the exposed conductor on said second part, an electrically conductive shoulder electrically and mechanically connected to said conductive member in between said first part and insulating member, and an electrically conductive spiral compression spring surrounding said first member portion from a first end of the spring that engages the exposed conductor on said first part to a second end of the spring that engages said shoulder.

10. An assembly according to claim 9 wherein the insulating member has a first portion into which said passage extends, and a second portion raised with respect to the first portion and engaging said first part, the shoulder on said conductive member thereby having a space within which to move between the first portion of the insulating member and the first part.

* * * * *